United States Patent
Wang

(10) Patent No.: US 11,982,821 B2
(45) Date of Patent: May 14, 2024

(54) DISPLAY PANEL

(71) Applicant: WUHAN CHINA STAR OPTOELECTRONICS SEMICONDUCTOR DISPLAY TECHNOLOGY CO., LTD., Hubei (CN)

(72) Inventor: Haoran Wang, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/620,721

(22) PCT Filed: Dec. 13, 2021

(86) PCT No.: PCT/CN2021/137332
§ 371 (c)(1),
(2) Date: Dec. 19, 2021

(87) PCT Pub. No.: WO2023/097755
PCT Pub. Date: Jun. 8, 2023

(65) Prior Publication Data
US 2024/0027658 A1 Jan. 25, 2024

(30) Foreign Application Priority Data
Dec. 1, 2021 (CN) ............................ 202111453183.9

(51) Int. Cl.
*G02B 3/08* (2006.01)

(52) U.S. Cl.
CPC ...................................... *G02B 3/08* (2013.01)

(58) Field of Classification Search
CPC ........................................................ G02B 3/08
See application file for complete search history.

(56) References Cited

U.S. PATENT DOCUMENTS

2021/0210010 A1* 7/2021 Gao .................... G09G 3/3225

FOREIGN PATENT DOCUMENTS

| CN | 105739156 A | 7/2016 |
| CN | 107819020 A | 3/2018 |

(Continued)

OTHER PUBLICATIONS

International Search Report in International application No. PCT/CN2021/137332, dated Aug. 25, 2022.

(Continued)

*Primary Examiner* — James C. Jones
(74) *Attorney, Agent, or Firm* — PV IP PC; Wei Te Chung; Zhigang Ma

(57) ABSTRACT

A display panel has a flat area and a curved side area at least disposed on one side of the flat area. The display panel includes a light-emitting device layer and a light exiting layer. The light-emitting device layer includes a plurality of pixels, and the pixels have a first opening area. The light exiting layer is disposed above the light-emitting device layer and includes a plurality of main light-concentrating structures corresponding to the pixels located in the curved side area. The main light-concentrating structures have a second opening area. In a direction from the curved side area to the flat area, a first difference between the first opening area and the second opening area gradually increases.

20 Claims, 4 Drawing Sheets

(56) References Cited

FOREIGN PATENT DOCUMENTS

| CN | 109904204 | A | 6/2019 |
|---|---|---|---|
| CN | 210110847 | U | 2/2020 |
| CN | 112038370 | A | 12/2020 |
| JP | 2018063403 | A | 4/2018 |

OTHER PUBLICATIONS

Written Opinion of the International Searching Authority in International application No. PCT/CN2021/137332, dated Aug. 25, 2022.

* cited by examiner

DISPLAY PANEL

FIELD OF INVENTION

The present application relates to the field of display panel technologies, and more particularly to a display panel.

BACKGROUND OF INVENTION

With the continuous development of display technologies, curved screen design has made a screen-to-body ratio of the display panel qualitatively improved, and consumers have more and more demand for curved screen products.

However, in a curved screen, because a viewing angle of a curved side area is gradually increasing relative to a flat area, a light intensity of the curved side area will gradually decrease, which will affect a display performance of the display panel.

Technical Problem

The present invention provides a display panel, which effectively solves issues of the display panel under a curved screen design that as a viewing angle of a curved side area gradually increases relative to a flat area, a light intensity of the curved side area gradually decreases, which affects a display performance of the display panel.

SUMMARY OF INVENTION

In one aspect, the present invention provides a display panel having a flat area and a curved side area at least disposed on one side of the flat area, wherein the display panel comprises:
  a light-emitting device layer comprising a plurality of pixels, the pixels having a first opening area;
  a light exiting layer disposed above the light-emitting device layer and comprising a plurality of main light-concentrating structures corresponding to the pixels located in the curved side area, and the main light-concentrating structures having a second opening area;
  wherein in a direction from the curved side area to the flat area, a first difference between the first opening area and the second opening area gradually increases.

More preferably, the light exiting layer further comprises an auxiliary light-concentrating structure corresponding to pixels located in the flat area, and the auxiliary light-concentrating structure has a third opening area, and a second difference between the first opening area and the third opening area is less than the first difference.

More preferably, the first opening area is greater than the third opening area and/or the first opening area is less than the third opening area.

More preferably, the light exiting layer does not comprise the auxiliary light-concentrating structure.

More preferably, the light exiting layer comprises a pattern layer and a planarization layer covering the pattern layer, wherein:
  the pattern layer comprises a plurality of first light exiting structures located in the curved side area;
  the planarization layer comprises a plurality of second light exiting structures located between adjacent first light exiting structures;
  a refractive index of the pattern layer is less than a refractive index of the planarization layer;
  the main light-concentrating structure is composed of the second light exiting structure and a side surface of the first light exiting structure located beside the second light exiting structure.

More preferably, a shape of the first light exiting structure is same as a shape of the pixel located in the curved side area.

More preferably, a shape of the first light exiting structure is a circle, a shape of the pixel located in the curved side area is a quadrilateral, and a diameter of the first light exiting structure is between a diameter of an inscribed circle and a diameter of a circumscribed circle of the pixel located in the curved side area.

More preferably, the light exiting layer comprises a pattern layer and a planarization layer covering the pattern layer, wherein:
  the pattern layer comprises a plurality of first light exiting structures located in the curved side area;
  the planarization layer comprises a plurality of second light exiting structures located between adjacent first light exiting structures;
  a refractive index of the pattern layer is greater than a refractive index of the planarization layer;
  a main light-concentrating structure is composed of the first light exiting structure and the planarization layer located above the first light exiting structure.

More preferably, the refractive index of the pattern layer is any value between 1.3 and 1.6, and the refractive index of the planarization layer is any value between 1.5 and 1.9.

More preferably, the first opening area is greater than the second opening area and/or the first opening area is less than the second opening area.

More preferably, the display panel further comprises a substrate and an encapsulation layer, wherein:
  the light-emitting device layer is disposed on the substrate;
  the encapsulation layer covers the light emitting device layer;
  the light exiting layer is disposed on the encapsulation layer.

More preferably, when a shape of the pixel and the main light-concentrating structure are same, a width of the pixel has a first size, a width of the main light-concentrating structure has a second size, and in the direction from the curved side area to the flat area, a difference between the first size and the second size gradually increases.

On the other hand, the present invention also provides a mobile terminal comprising a display panel, the display panel having a flat area and a curved side area at least disposed on one side of the flat area, wherein the display panel comprises:
  a light-emitting device layer comprising a plurality of pixels, the pixels having a first opening area;
  a light exiting layer disposed above the light-emitting device layer and comprising a plurality of main light-concentrating structures corresponding to the pixels located in the curved side area, and the main light-concentrating structures having a second opening area;
  wherein in a direction from the curved side area to the flat area, a first difference between the first opening area and the second opening area gradually increases.

More preferably, the light exiting layer further comprises an auxiliary light-concentrating structure corresponding to pixels located in the flat area, and the auxiliary light-concentrating structure has a third opening area, and a second difference between the first opening area and the third opening area is less than the first difference.

More preferably, the first opening area is greater than the third opening area and/or the first opening area is less than the third opening area.

More preferably, the light exiting layer does not comprise the auxiliary light-concentrating structure.

More preferably, the light exiting layer comprises a pattern layer and a planarization layer covering the pattern layer, wherein:

the pattern layer comprises a plurality of first light exiting structures located in the curved side area;

the planarization layer comprises a plurality of second light exiting structures located between adjacent first light exiting structures;

a refractive index of the pattern layer is less than a refractive index of the planarization layer;

the main light-concentrating structure is composed of the second light exiting structure and a side surface of the first light exiting structure located beside the second light exiting structure.

More preferably, a shape of the first light exiting structure is same as a shape of the pixel located in the curved side area.

More preferably, a shape of the first light exiting structure is a circle, a shape of the pixel located in the curved side area is a quadrilateral, and a diameter of the first light exiting structure is between a diameter of an inscribed circle and a diameter of a circumscribed circle of the pixel located in the curved side area.

More preferably, the light exiting layer comprises a pattern layer and a planarization layer covering the pattern layer, wherein:

the pattern layer comprises a plurality of first light exiting structures located in the curved side area;

the planarization layer comprises a plurality of second light exiting structures located between adjacent first light exiting structures;

a refractive index of the pattern layer is greater than a refractive index of the planarization layer;

a main light-concentrating structure is composed of the first light exiting structure and the planarization layer located above the first light exiting structure.

Beneficial Effect

The present invention provides a display panel having a flat area and a curved side area at least disposed on one side of the flat area, wherein the display panel comprises: a light-emitting device layer comprising a plurality of pixels, the pixels having a first opening area, a light exiting layer disposed above the light-emitting device layer and comprising a plurality of main light-concentrating structures corresponding to the pixels located in the curved side area, and the main light-concentrating structures having a second opening area, wherein in a direction from the curved side area to the flat area, a first difference between the first opening area and the second opening area gradually increases. In the display panel provided by the present invention, in the direction from the flat area to the curved side area, the first difference between the first opening area of the pixels located in the curved side area and the second opening area of the main light-concentrating structure is designed to gradually decrease, so as to gradually increase a light-concentrating degree. This effectively improves the problem that the viewing angle of the curved side area is gradually increasing relative to the flat area, and the light intensity of the curved side area is gradually reduced, thereby affecting the display performance of the display panel.

DESCRIPTION OF DRAWINGS

In order to explain the technical solution of the present invention more clearly, the following will briefly introduce the accompanying drawings used in the description of each embodiment according to the present invention. Obviously, the drawings in the following description are only some embodiments of the present invention. For those skilled in the art, without creative work, other drawings can be obtained based on these drawings.

DETAILED DESCRIPTION OF PREFERRED EMBODIMENTS

Figure 1:
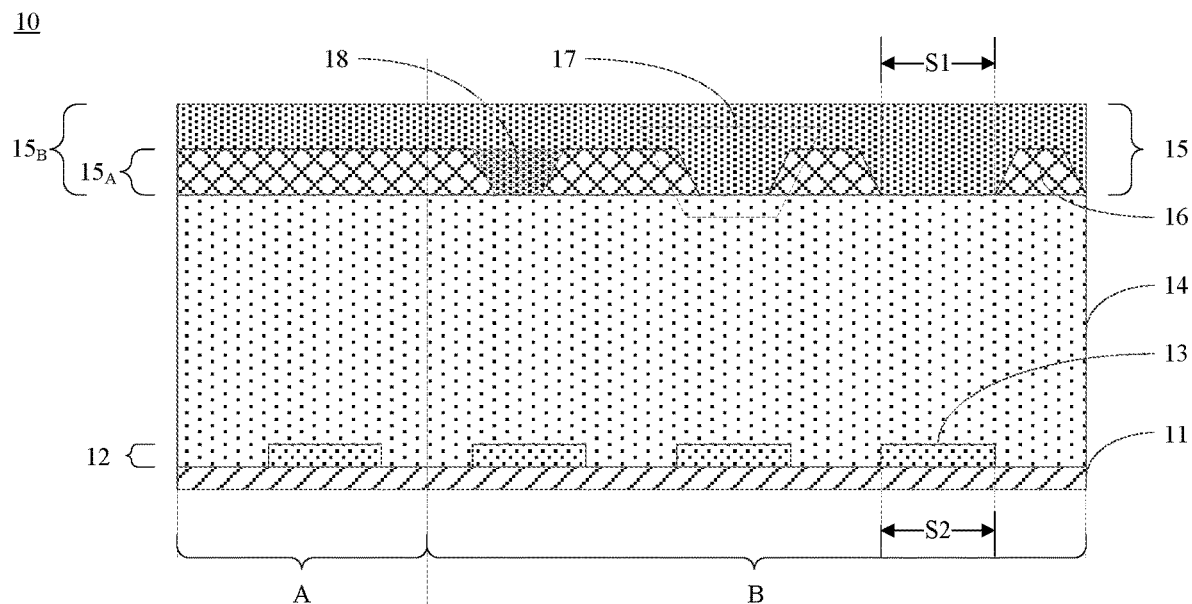
FIG. 1 is a schematic diagram of a cross-sectional structure of a display panel provided by a first embodiment according to the present invention.

The technical solutions in the embodiments of the present invention will be clearly and completely described below in conjunction with the drawings in the embodiments of the present invention. Obviously, the described embodiments are only a part of the embodiments of the present invention, rather than all the embodiments. Based on the embodiments of the present invention, all other embodiments obtained by those skilled in the art without creative work shall fall within the protection scope of the present invention.

In the description of the present invention, it should be understood that the terms "center", "longitudinal", "transverse", "length", "width", "thickness", "upper", "lower", "front", "back", "left", "right", "vertical", "horizontal", "top", "bottom", "inner", "outer", "clockwise", "counterclockwise" and other directions or a positional relationship are based on the orientation or positional relationship shown in the drawings. This is only for the convenience of describing the present invention and simplifying the description, rather than indicating or implying that the device or element referred to must have a specific orientation, be configured and operated in a specific orientation. Therefore, it cannot be understood as a limitation to the present invention. In addition, the terms "first" and "second" are only used for descriptive purposes, and cannot be understood as indicating or implying relative importance or implicitly indicating the number of indicated technical features. Therefore, the features defined with "first" and "second" may explicitly or implicitly include one or more of the features. In the description of the present invention, "plurality" means two or more than two, unless specifically defined otherwise.

In the description of the present invention, it should be noted that the terms "installed", "linked", and "connected" should be understood in a broad sense unless otherwise clearly defined and limited. For example, it can be a fixed connection, a detachable connection, or an integral connection. It can be mechanically connected or electrically connected or can communicate with each other. It can be directly connected or indirectly connected through an intermediary. It can be a communication between two elements or an interaction relationship between two elements. For those of ordinary skill in the art, the specific meanings of the above-mentioned terms in the present invention can be understood according to specific circumstances.

In the present invention, unless otherwise clearly defined and limited, the first feature being "on" or "under" the second feature may include direct contact between the first feature and the second feature. It may also be included that the first and second features are not in direct contact but in contact with another feature between them. Moreover, "above", "upon" and "on top of" the second feature of the first feature include the first feature being directly above and obliquely above the second feature, or merely indicating that the level of the first feature is higher than that of the second feature. The "below", "underneath" and "under" of the second feature of the first feature include the first feature directly below and obliquely below the second feature, or it simply means that the level of the first feature is smaller than the second feature.

The following disclosure provides many different embodiments or examples for realizing different structures of the present invention. In order to simplify the disclosure of the present invention, the components and settings of specific examples are described below. Of course, they are only examples, and are not intended to limit the invention. In addition, the present invention may repeat reference numerals and/or reference letters in different examples. This repetition is for the purpose of simplification and clarity, and does not in itself indicate the relationship between the various embodiments and/or settings discussed. In addition, the present invention provides examples of various specific processes and materials. However, those of ordinary skill in the art may be aware of the application of other processes and/or the use of other materials.

The present invention is aimed at a display panel under a current curved screen design. As a viewing angle of a curved side area gradually increases relative to a flat area, a light intensity of the curved side area gradually decreases, which affects a display performance of the display panel. The embodiments according to the present invention are used to solve this problem.

Refer to FIG. 1, which shows a schematic cross-sectional structure diagram of a display panel 10 according to a first embodiment of the present invention. From the figure, it is very intuitive to see the components of the first embodiment according to the present invention and the relative positional relationship of the components.

As shown in FIG. 1, the display panel 10 has a flat area A and a curved side area B at least disposed on one side of the flat area A, and the display panel 10 includes:

A substrate 11;

a light-emitting device layer 12 disposed on the substrate 11 and comprising a plurality of pixels 13, the pixels 13 having a first opening area S1;

an encapsulation layer 14 covering the light-emitting device layer 12;

a light exiting layer 15 disposed on the encapsulation layer 14 and comprising a plurality of main light-concentrating structures 17 corresponding to the pixels 13 located in the curved side area B, and the main light-concentrating structures 17 having a second opening area S2;

wherein in a direction from the curved side area B to the flat area A, a first difference between the first opening area S1 and the second opening area S2 gradually increases.

It should be noted that when shapes of the pixels 13 and the main light-concentrating structure 17 are same, their cross-sectional shapes are also the same. In addition, a width of the pixel 13 has a first size, and a width of the main light-concentrating structure 17 has a second size. In addition, "in the direction from the curved side area B to the flat area A, the first difference between the first opening area S1 and the second opening area S2 gradually increases" may be equivalent to "in the direction from the curved side area B to the flat area A, the difference between the first width and the second width gradually increases."

Figure 2:
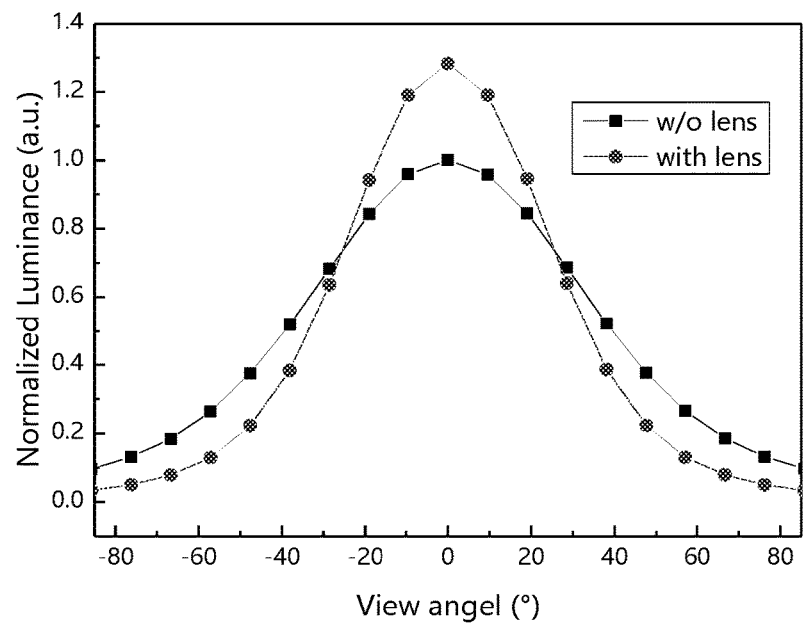
FIG. 2 is a schematic diagram of a light intensity of a display panel at different viewing angles with or without a micro lens structure.

It should be noted that, in order to improve the luminous efficiency of the display panel and further reduce the power consumption of the display device to extend its lifespan, a micro lens structure is generally used to converge light to increase the light intensity within a certain angle from the front. FIG. 2 shows the light intensity of the display panel at different brightness viewing angles with or without the micro lens structure.

In this embodiment, the main light-concentrating structure 17 is the above-mentioned micro lens. Further, in the main light-concentrating structure 17, the intensity of its light-concentrating degree is related to the second opening area S2 of the main light-concentrating structure 17 and the first opening area S1 of the pixel 13 directly below the main light-concentrating structure 17. The first difference between is strongly correlated. The smaller the above-mentioned first difference (that is, the closer the second opening area S2 of the main light-concentrating structure 17 is to the first opening area S1 of the pixel 13), the stronger the light collecting degree of the main light-concentrating structure 17 is.

It is easy to understand that under normal circumstances, as the viewing angle of the curved side area B is gradually increasing relative to the flat area A, the light intensity of the curved side area B will gradually decrease. In this embodiment, the first difference is designed to gradually decrease in the direction from the flat area A to the curved side area B. This can gradually increase the light concentration of the main light-concentrating structure 17 so that the compensation degree of the main light-concentrating structure 17 to the low light intensity of the curved side area B is linearly related to the size of the observation angle. Therefore, the brightness effects of the flat area A and the curved edge area B can be consistent, and the display effect of the display panel 10 is effectively improved.

Further, in this embodiment, the light exiting layer 15 includes a pattern layer 15A and a planarization layer 15B covering the pattern layer, wherein:

the pattern layer 15A includes a plurality of first light exiting structures 16 located in the curved side area B;
the planarization layer 15B includes a plurality of second light exiting structures 18 located between adjacent first light exiting structures 16;
a refractive index of the pattern layer 15A is smaller than a refractive index of the planarization layer 15B.

As shown in FIG. 1, in this embodiment, the main light-concentrating structure 17 is composed of the second light exiting structure 18 and a side surface of the first light exiting structure 16 located beside the second light exiting structure 18. The second opening area S2 of the main light-concentrating structure 17 is the opening area of the second light exiting structure 18 (that is, the distance between adjacent first light exiting structures 16 or the opening area of the pattern layer 15A). The pixels 13 in the curved area B are located under the corresponding second light exiting structure 18 (that is, under the opening of the pattern layer 15A).

Further, in this embodiment, the second opening area S2 of the main light-concentrating structure 17 is less than or equal to the first opening area S1 of the pixel 13 located in the curved area B. However, in other modifications made by the present invention, the second opening area S2 of the main light-concentrating structure 17 may be partly greater than or equal to the first opening area S1 of the pixel 13 located in the curved side area B, and partly less than or equal to the first opening area S1 of the pixel 13 located in the curved side area B. The first opening area S1 of the pixel 13. It is only necessary to ensure that the first difference between the first opening area S1 and the second opening area S2 gradually increases in the direction from the curved side area B to the flat area A.

Figure 3:
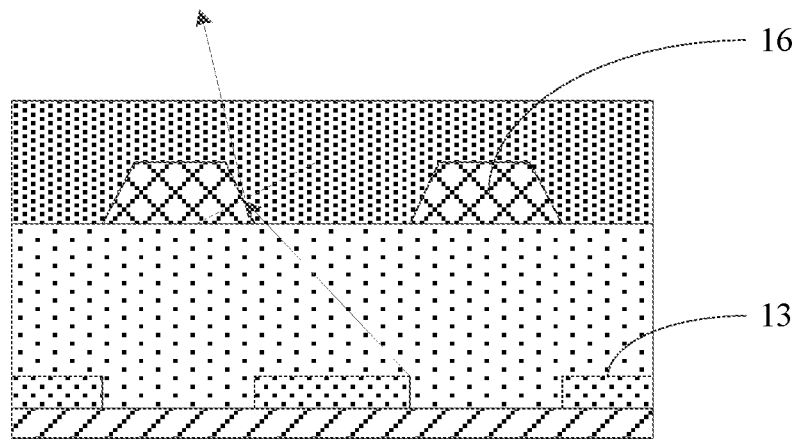
FIG. 3 is a schematic diagram of light condensing of a light exiting layer of a display panel provided by a first embodiment according to the present invention.

Specifically, referring to FIG. 3, in this embodiment, since the refractive index of the patterned layer 15A is smaller than the refractive index of the planarization layer 15B, the main light-concentrating structure 17 mainly reflects and focuses light.

Further, in this embodiment, the first light exiting structure 16 has the same shape as the pixel 13 located in the curved area B. The refractive index of the pattern layer 15A is any value between 1.3 and 1.6. Exemplary materials of the pattern layer 15A include, but are not limited to, epoxy-based and acrylic-based organic materials, and inorganic materials such as $SiO_2$ and SiON. The refractive index of the planarization layer 15B is any value between 1.5 and 1.9. Exemplary materials of the planarization layer 15B include, but are not limited to, organic materials doped with $ZrO_2$ and $TiO_2$ nanoparticles, and organic-inorganic hybrid materials such as metal oxides. The materials of the pattern layer 15A and the planarization layer 15B are both transparent materials.

Different from the prior art, the first embodiment according to the present invention provides a display panel 10 having a flat area A and a curved side area B at least on one side of the flat area A. The display panel 10 includes: a light-emitting device layer 12 comprising a plurality of pixels 13, the pixels 13 having a first opening area S1, a light exiting layer 15 disposed above the light-emitting device layer 12 and comprising a plurality of main light-concentrating structures 17 corresponding to the pixels 13 located in the curved side area B, and the main light-concentrating structures 17 having a second opening area S2, wherein in a direction from the curved side area B to the flat area A, a first difference between the first opening area S1 and the second opening area S2 gradually increases. In the display panel 10 provided by the present invention, in the direction from the flat area A to the curved side area B, the first difference between the first opening area S1 of the pixels 13 located in the curved side area B and the second opening area S2 of the main light-concentrating structure 17 is designed to gradually decrease (and the first opening area S1 is greater than or equal to the second opening area S2), so as to gradually increase a light-concentrating degree. This effectively improves the problem that the viewing angle of the curved side area B is gradually increasing relative to the flat area A, and the light intensity of the curved side area B is gradually reduced, thereby affecting the display performance of the display panel 10.

Figure 4:
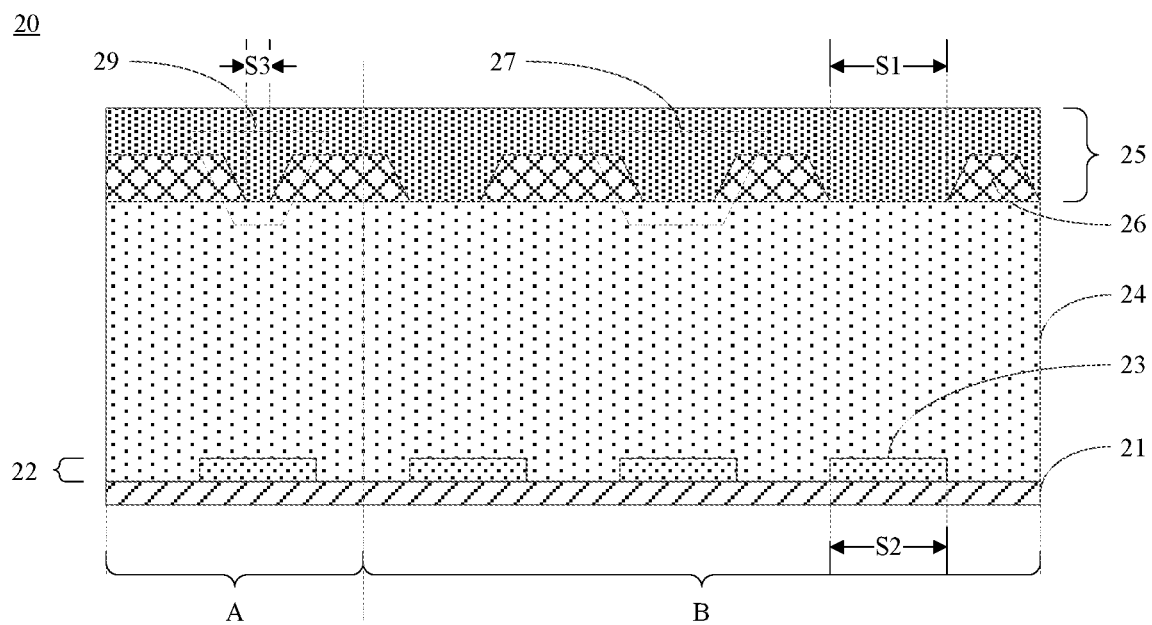
FIG. 4 is a schematic diagram of a cross-sectional structure of a display panel provided by a second embodiment according to the present invention.

Please refer to FIG. 4. FIG. 4 shows a schematic cross-sectional structure diagram of a display panel 20 according to a second embodiment of the present invention. From the figure, it is very intuitive to see the components of the second embodiment according to the present invention and the relative positional relationship of the components.

As shown in FIG. 4, the structure of the second embodiment is substantially the same as that of the first embodiment. The function and position of a substrate 21 in the second embodiment are the same as those of the substrate 11 in the first embodiment. A light-emitting device layer 22 (including a plurality of pixels 23) in the second embodiment has the same function and arrangement position as the light-emitting device layer 12 (including a plurality of pixels 13) in the first embodiment. An encapsulation layer 24 in the second embodiment has the same function and arrangement position as the encapsulation layer 14 in the first embodiment. A light exiting layer 25 in the second embodiment has the same function and arrangement position as the light exiting layer 15 in the first embodiment.

The difference lies in that, in this embodiment, the light exiting layer not only includes the first light exiting structure 26 having the same function and setting position as the first light exiting structure 16 in the first embodiment. The light exiting layer 25 also includes an auxiliary light-concentrating structure 29 corresponding to the pixel 23 located in the flat area A (that is, in the first embodiment described above, the light exiting layer 15 does not include the auxiliary light-concentrating structure corresponding to the pixel 13 located in the flat area A). The auxiliary light-concentrating structure 29 has a third opening area S3. The second difference between the first opening area S1 of the pixel 23 in the flat area A and the third opening area S3 of the auxiliary light-concentrating structure 29 is less than the first difference between the first opening area S1 of the pixel 23 in the curved side area B and the second opening area S2 of the main light-concentrating structure 27. That is, in this embodiment, a micro lens structure is also provided on the light exiting layer 25 of the flat area A to improve the light exiting intensity of the front surface of the display panel 20. The observation angle of the flat area A is smaller than that of the curved side area B, and the light intensity of the flat area A is greater than the light intensity of the curved side area B. Therefore, when the auxiliary light-concentrating structure 29 is provided in the flat area A to increase the front light intensity, the second difference between the first opening area S1 and the third opening area S3 should be smaller than the first difference between the first opening area S1 and the second opening area S2. This improves the overall light intensity of the display panel and further, the brightness effects of the flat area A and the curved edge area B are also consistent.

It is easy to understand that, in this embodiment, the first opening area S1 of the pixel 23 of the flat area A is larger than the third opening area S3 of the auxiliary light-concentrating structure 29. However, in other modifications made by the present invention, the first opening area S1 of the pixel 23 in the flat area A may be partly larger than the third opening area S3 of the auxiliary light-concentrating structure 29, and partly smaller than the third opening area S3 of the auxiliary light-concentrating structure 29. It is only necessary to ensure that the second difference between the first opening area S1 and the third opening area S3 is smaller than the first difference between the first opening area S1 and the second opening area S2.

Different from the prior art, the second embodiment according to the present invention provides a display panel 20 having a flat area A and a curved side area B at least on one side of the flat area A. The display panel 20 includes: a light-emitting device layer 22 comprising a plurality of pixels 23, the pixels 23 having a first opening area S1, a light exiting layer 25 disposed above the light-emitting device layer 22 and comprising a plurality of main light-concentrating structures 27 corresponding to the pixels 23 located in the curved side area B, and the main light-concentrating structures 27 having a second opening area S2, wherein in a direction from the curved side area B to the flat area A, a first difference between the first opening area S1 and the second opening area S2 gradually increases. In the display panel 20 provided by the present invention, in the direction from the flat area A to the curved side area B, the first difference between the first opening area S1 of the pixels 23 located in the curved side area B and the second opening area S2 of the main light-concentrating structure 27 is designed to gradually decrease, so as to gradually increase a light-concentrating degree. This effectively improves the problem that the viewing angle of the curved side area B is gradually increasing relative to the flat area A, and the light intensity of the curved side area B is gradually reduced, thereby affecting the display performance of the display panel 20. Further, an auxiliary light-concentrating structure 29 is provided above a projection of the pixel 23 in the flat area A, which improves the overall light intensity of the display panel 20.

Figure 5:
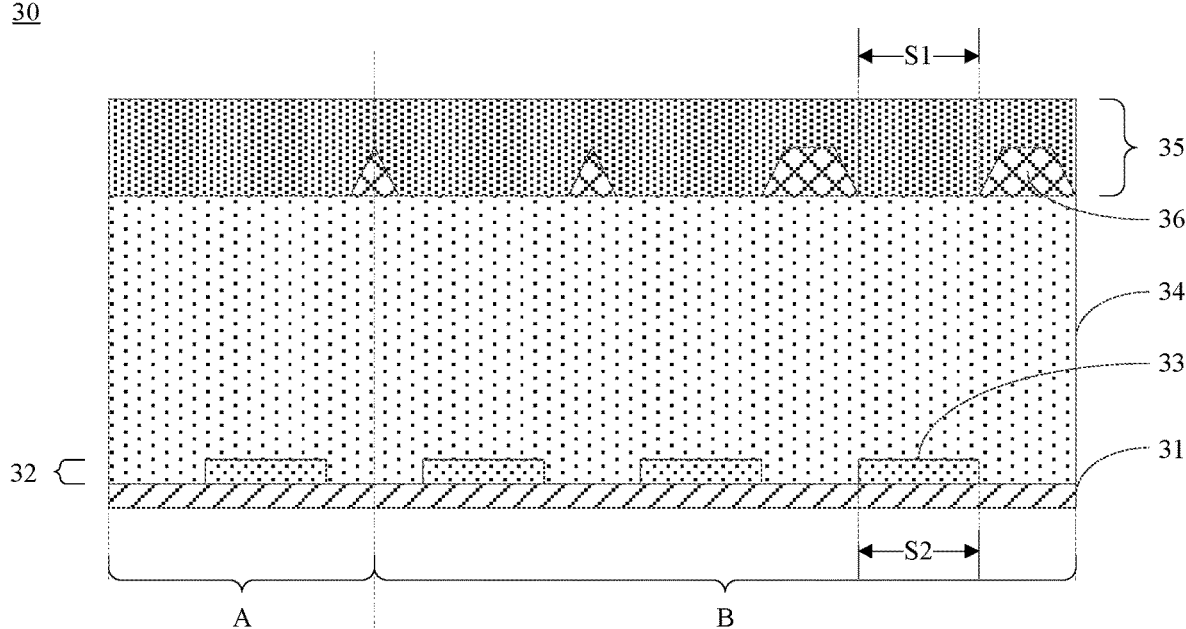
FIG. 5 is a schematic diagram of a cross-sectional structure of a display panel provided by a third embodiment according to the present invention.

Refer to FIG. 5, which shows a schematic cross-sectional structure diagram of a display panel 30 according to a third embodiment of the present invention. From the figure, it is very intuitive to see the various components of the third embodiment according to the present invention and the relative positional relationship of the various components.

As shown in FIG. 5, the structure of the third embodiment is substantially the same as that of the first embodiment, and the function and setting position of a substrate 31 in the third embodiment are the same as that of the substrate 11 in the first embodiment. A light emitting device layer 32 (including a plurality of pixels 33) in the third embodiment has the same function and arrangement position as the light emitting device layer 12 (including a plurality of pixels 13) in the first embodiment. An encapsulation layer 34 in the third embodiment has the same function and arrangement position as the encapsulation layer 14 in the first embodiment. A light exiting layer 35 in the third embodiment has the same function and arrangement position as the light exiting layer 15 in the first embodiment.

The difference is that in this embodiment, the second opening area S2 of the main light-concentrating structure (that is, the distance between adjacent first light exiting structures 36, or the opening area of the pattern layer) is greater than or equal to the first opening area S1 of the pixel 33 in the curved side area B.

Different from the prior art, the third embodiment according to the present invention provides a display panel 30 having a flat area A and a curved side area B at least on one side of the flat area A. The display panel 30 includes: a light-emitting device layer 32 comprising a plurality of pixels 33, the pixels 33 having a first opening area S1, a light exiting layer 35 disposed above the light-emitting device layer 32 and comprising a plurality of main light-concentrating structures 37 corresponding to the pixels 33 located in the curved side area B, and the main light-concentrating structures 37 having a second opening area S2, wherein in a direction from the curved side area B to the flat area A, a first difference between the first opening area S1 and the second opening area S2 gradually increases. In the display panel 30 provided by the present invention, in the direction from the flat area A to the curved side area B, the first difference between the first opening area S1 of the pixels 33 located in the curved side area B and the second opening area S2 of the main light-concentrating structure 37 is designed to gradually decrease (and the first opening area S1 is less than or equal to the second opening area S2), so as to gradually increase a light-concentrating degree. This effectively improves the problem that the viewing angle of the curved side area B is gradually increasing relative to the flat area A, and the light intensity of the curved side area B is gradually reduced, thereby affecting the display performance of the display panel 30.

Figure 6:
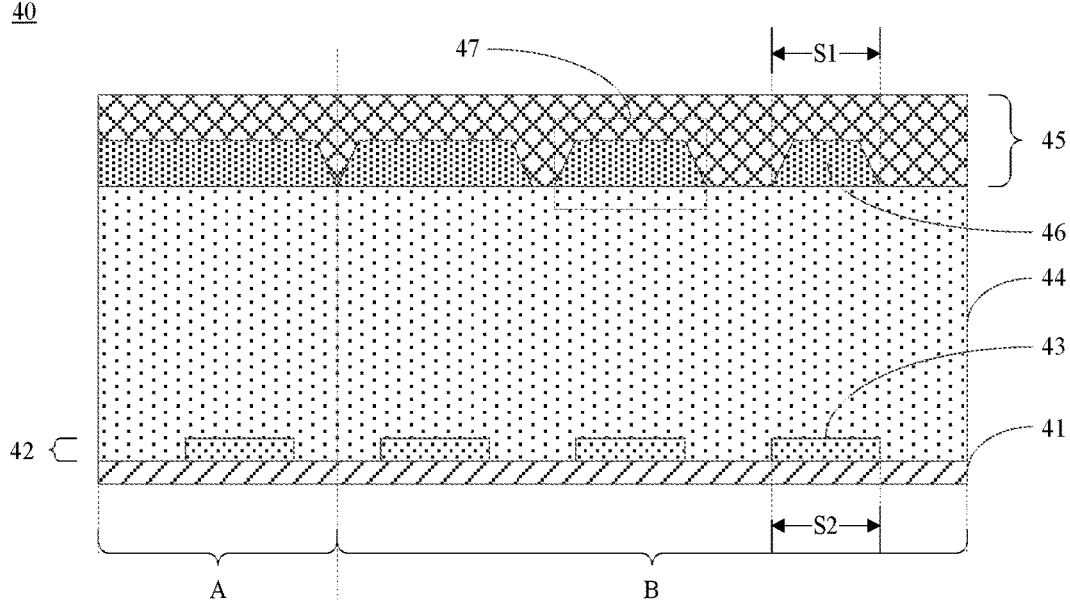
FIG. 6 is a schematic diagram of a cross-sectional structure of a display panel provided by a fourth embodiment according to the present invention.

Refer to FIG. 6, which shows a schematic cross-sectional structure diagram of a display panel 40 according to a fourth embodiment of the present invention. From the figure, it is very intuitive to see the various components of the fourth embodiment according to the present invention and the relative positional relationship of the various components.

As shown in FIG. 6, the structure of the fourth embodiment is substantially the same as that of the first embodiment. The function and setting position of a substrate 41 in the fourth embodiment are the same as those of the substrate 11 in the first embodiment. A light emitting device layer 42 (including a plurality of pixels 43) in the fourth embodiment has the same function and arrangement position as the light emitting device layer 12 (including a plurality of pixels 13) in the first embodiment. An encapsulation layer 44 in the fourth embodiment has the same function and arrangement position as the encapsulation layer 14 in the first embodiment. A light exiting layer 45 in the fourth embodiment has the same function and arrangement position as the light exiting layer 15 in the first embodiment.

The difference is that in this embodiment, the refractive index of the patterned layer is greater than the refractive index of the planarization layer. The main light-concentrating structure 47 is composed of a first light exiting structure 46 and a planarization layer located above the first light exiting structure 46. The second opening area S2 of the main light-concentrating structure 47 is the opening area of the first light exiting structure 46 (that is, the pattern opening area of the pattern layer). The pixels 43 in the curved area B are located under the corresponding first light exiting structure 46 (that is, located under the pattern of the pattern layer).

Specifically, in this embodiment, since the refractive index of the patterned layer is greater than the refractive index of the planarization layer, the main light-concentrating structure 47 mainly refracts and concentrates light.

Different from the prior art, the fourth embodiment according to the present invention provides a display panel 40 having a flat area A and a curved side area B at least on one side of the flat area A. The display panel 40 includes: a light-emitting device layer 42 comprising a plurality of pixels 43, the pixels 43 having a first opening area S1, a light exiting layer 45 disposed above the light-emitting device layer 42 and comprising a plurality of main light-concentrating structures 47 corresponding to the pixels 43 located in the curved side area B, and the main light-concentrating structures 47 having a second opening area S2, wherein in a direction from the curved side area B to the flat area A, a first difference between the first opening area S1 and the second opening area S2 gradually increases. In the display panel 30 provided by the present invention, in the direction from the flat area A to the curved side area B, the first difference between the first opening area S1 of the pixels 33 located in the curved side area B and the second opening area S2 of the main light-concentrating structure 47 is designed to gradually decrease, so as to gradually increase a light-concentrating degree. This effectively improves the problem that the viewing angle of the curved side area B is gradually increasing relative to the flat area A, and the light intensity of the curved side area B is gradually reduced, thereby affecting the display performance of the display panel 40.

Figure 7:
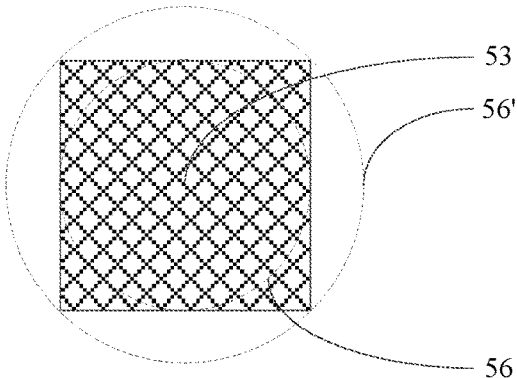
FIG. 7 is a schematic diagram of a relationship between a first light exiting structure of a display panel and an aperture area of pixels located in a curved side area according to a fifth embodiment of the present invention.

Refer to FIG. 7, which shows a schematic diagram of a relationship between a first light exiting structure (56 or 56') of a display panel and an aperture area of a pixel 53 located in a curved side area according to a fifth embodiment of the present invention.

The structure of the display panel provided by the fifth embodiment according to the present invention is substantially the same as that of the first embodiment. The difference is that in this embodiment, the shape of the first light exiting (56 or 56') is circular. The shape of the pixel 53 located in the curved side area is a quadrilateral. The diameter of the first light exiting structure (56 or 56') is between the diameter of the inscribed circle and the diameter of the circumscribed circle of the pixel 53 located in the curved side area.

Different from the prior art, the fifth embodiment according to the present invention provides a display panel having a flat area and a curved side area at least on one side of the flat area. The display panel includes: a light-emitting device layer including a plurality of pixels 53, the pixels 53 have a first opening area, and a light exiting layer disposed above the light-emitting device layer including a plurality of main light-concentrating structures corresponding to the pixels 53 located in the curved side area, and the light exiting layer includes a pattern layer and a planarization layer covering the pattern layer. The pattern layer includes a plurality of first light exiting structures (56 or 56') located in the curved side area. The planarization layer includes a plurality of second light exiting structures located between adjacent first light exiting structures. The refractive index of the pattern layer is greater than the refractive index of the planarization layer. The main light-concentrating structure is composed of a first light exiting structure (56 or 56') and a planarization layer located above the first light exiting structure, and has a second opening area. In the direction from the curved side area to the flat area, the first difference between the first opening area of the pixel 53 and the second opening area of the main light-concentrating structure gradually increases. The shape of the first light exiting structure (56 or 56') is circular. The shape of the pixel 53 located in the curved side area is a quadrilateral. The diameter of the first light exiting structure (56 or 56') is between the diameter of the inscribed circle and the diameter of the circumscribed circle of the pixel 53 located in the curved side area. In the display panel provided by the present invention, in the direction from the flat area to the curved side area, the first difference between the first opening area of the pixel 53 located in the curved side area and the second opening area of the main light-concentrating structure is designed to gradually decrease, so as to gradually increase the degree of light concentration. This effectively improves the problem that the viewing angle of the curved side area is gradually increasing relative to the flat area, and the light intensity of the curved side area is gradually reduced, thereby affecting the display performance of the display panel.

Figure 8:
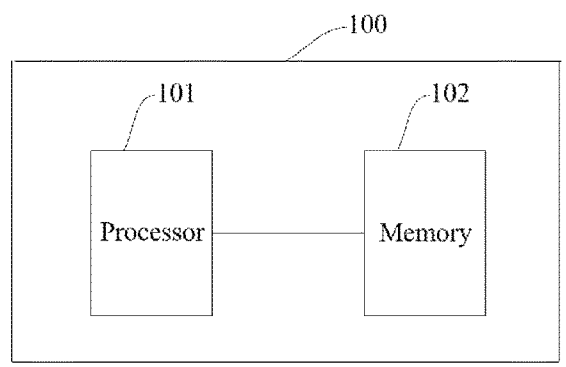
FIG. 8 is a schematic structural diagram of a mobile terminal according to an embodiment of the present invention.

Refer to FIG. 8, which is a schematic structural diagram of a mobile terminal according to an embodiment of the present invention. The display panels in the first to fifth embodiments described above can all be applied to the mobile terminal. The mobile terminal can be a smart phone or a tablet computer. From the figure, it is possible to intuitively see the various components of the present invention and the relative positional relationship of the various components.

As shown in FIG. 8, the mobile terminal 100 includes a processor 101 and a memory 102. The processor 101 and the memory 102 are electrically connected.

The processor 101 is the control center of the mobile terminal 100. By utilizing various interfaces and lines to connect various parts of the entire mobile terminal, running or loading application programs stored in the memory 102, and calling data stored in the memory 102, various functions of the mobile terminal and processing data are executed. Thus, the overall monitoring of the mobile terminal is carried out.

Figure 9:
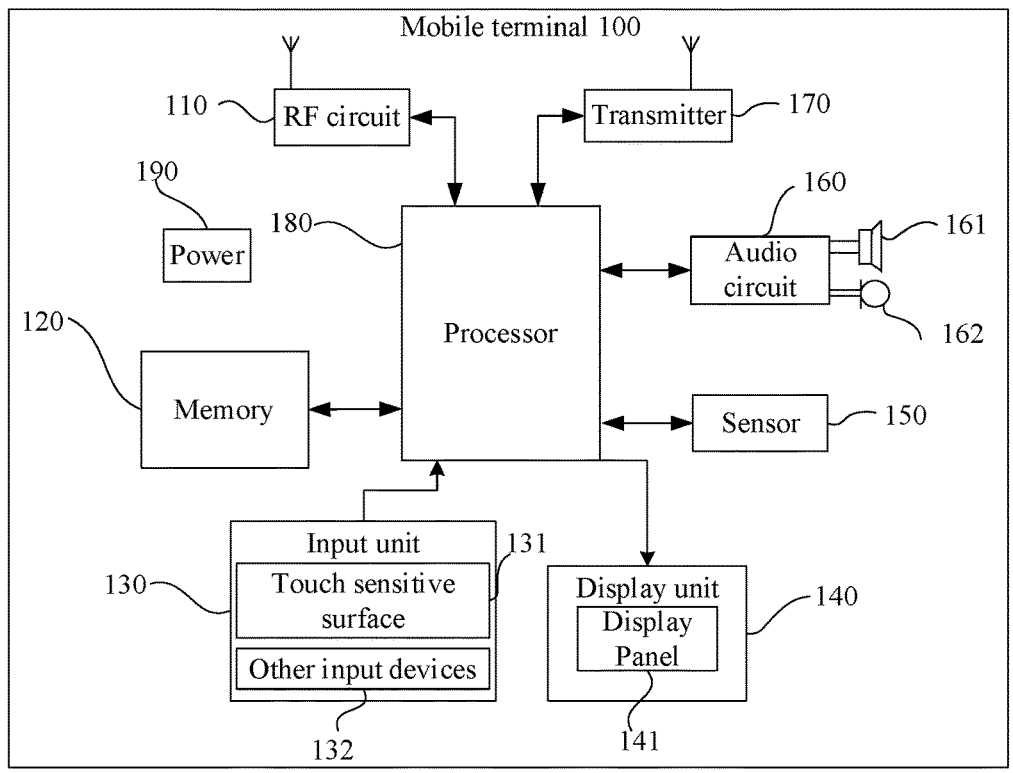
FIG. 9 is a schematic diagram of a detailed structure of a mobile terminal according to an embodiment of the present invention.

Refer to FIG. 9, which is a schematic diagram of a detailed structure of a mobile terminal according to an embodiment of the present invention. The mobile terminal can be a smart phone or a tablet computer. From the figure, it is possible to intuitively see the various components of the present invention and the relative positional relationship of the various components.

FIG. 9 shows a specific structural block diagram of a mobile terminal 100 provided by an embodiment of the present invention. As shown in FIG. 9, the mobile terminal 100 may include a radio frequency (RF) circuit 110, a memory 120 including one or more computer-readable storage media, an input unit 130, a display unit 140, a sensor 150, an audio circuit. 160, a transmission module 170 (for example, wireless fidelity, Wi-Fi, wireless fidelity), a processor 180 including one or more processing cores, and components such as a power supply 190. Those skilled in the art can understand that the structure of the mobile terminal shown in FIG. 9 does not constitute a limitation on the mobile terminal and may include more or fewer components than shown in the figure, or combine certain components, or arrange different components.

The RF circuit 110 is used to receive and send electromagnetic waves, realize the mutual conversion between electromagnetic waves and electrical signals, and communicate with a communication network or other devices. The RF circuit 110 may include various existing circuit components for performing these functions, for example, an antenna, a radio frequency transceiver, a digital signal processor, an encryption/decryption chip, a subscriber identity module (SIM) card, a memory, and so on. The RF circuit 110 can communicate with various networks such as the internet, an enterprise intranet, and a wireless network, or communicate with other devices through a wireless network. The aforementioned wireless network may include a cellular telephone network, a wireless local area network, or a metropolitan area network. The above-mentioned wireless network can use various communication standards, protocols and technologies, including but not limited to Global System for Mobile Communication (GSM), Enhanced Data GSM Environment (EDGE), broadband code Wideband Code Division Multiple Access (WCDMA), Code Division Access (CDMA), Time Division Multiple Access (TDMA), Wireless Fidelity (Wi-Fi) Fi) (such as the American Institute of Electrical and Electronics Engineers standards IEEE 802.11a, IEEE 802.11b, IEEE802.11g and/or IEEE 802.11n), Voice over Internet Protocol (VoIP), Worldwide Interoperability for Microwave Access, Wi-Max), other protocols used for mail, instant messaging and short messages, and any other suitable communication protocols, even those that have not yet been developed.

The memory 120 can be used to store software programs and modules, such as the corresponding program instructions in the above-mentioned audio power amplifier control method. The processor 180 executes various functional applications and data processing by running the software programs and modules stored in the memory 120. The frequency of the information transmission signal transmitted by the mobile terminal 100 is acquired. Functions such as generating interference signals. The memory 120 may include a high-speed random access memory, and may also include a non-volatile memory, such as one or more magnetic storage devices, flash memory, or other non-volatile solid-state memories. In some examples, the memory 120 may further include a memory remotely provided with respect to the processor 180, and these remote memories may be connected to the mobile terminal 100 via a network. Examples of the aforementioned networks include, but are not limited to, the Internet, corporate intranets, local area networks, mobile communication networks, and combinations thereof.

The input unit 130 may be used to receive inputted digital or character information, and generate keyboard, mouse, joystick, optical or trackball signal input related to user settings and function control. Specifically, the input unit 130 may include a touch-sensitive surface 131 and other input devices 132. The touch-sensitive surface 131, also called a touch screen or a touchpad, can collect user touch operations on or near it (for example, the user uses any suitable objects or accessories such as fingers, stylus, etc.) on or on the touch-sensitive surface 131. Operation near the touch-sensitive surface 131) and drive the corresponding connection device according to a preset program. Optionally, the touch-sensitive surface 131 may include two parts: a touch detection device and a touch controller. The touch detection device detects the user's touch position, detects the signal brought about by the touch operation, and transmits the signal to the touch controller. The touch controller receives the touch information from the touch detection device, converts it into contact coordinates, and sends it to the processor 180, and can receive and execute the command sent by the processor 180. In addition, the touch-sensitive surface 131 can be implemented in multiple types such as resistive, capacitive, infrared, and surface acoustic wave. In addition to the touch-sensitive surface 131, the input unit 130 may also include other input devices 132. Specifically, the other input device 132 may include, but is not limited to, one or more of physical keyboards, function keys (such as a volume control button, a switch button, etc.), a trackball, a mouse, and a joystick.

The display unit 140 may be used to display information input by the user or information provided to the user and various graphical user interfaces of the mobile terminal 100. These graphical user interfaces can be composed of graphics, text, icons, videos, and any combination thereof. The display unit 140 may include a display panel 141. Optionally, the display panel 141 may be configured in the form of LCD (liquid crystal display), OLED (organic light emitting diode), etc. Further, the touch-sensitive surface 131 may cover the display panel 141. When the touch-sensitive surface 131 detects a touch operation on or near it, it is transmitted to the processor 180 to determine the type of the touch event. The processor 180 then provides a corresponding visual output on the display panel 141 according to the type of the touch event. Although in the figure, the touch-sensitive surface 131 and the display panel 141 are used as two independent components to implement input and output functions. However, in some embodiments, the touch-sensitive surface 131 can be integrated with the display panel 141 to implement input and output functions.

The mobile terminal 100 may also include at least one sensor 150, such as a light sensor, a motion sensor, and other sensors. Specifically, the light sensor may include an ambient light sensor and a proximity sensor. The ambient light sensor can adjust the brightness of the display panel 141 according to the brightness of the ambient light. The proximity sensor can generate an interrupt when the flip is closed or closed. As a kind of motion sensor, the gravity acceleration sensor can detect the magnitude of acceleration in various directions (usually three-axis) and can detect the magnitude and direction of gravity when it is stationary. It can be used to identify mobile phone posture applications (such as horizontal and vertical screen switching, related games, magnetometer posture calibration), vibration recognition related functions (such as pedometer, percussion), etc. As for other sensors, such as gyroscope, barometer, hygrometer, thermometer, infrared sensor, etc., that can be configured in the mobile terminal 100, details are not described herein again.

The audio circuit 160, the speaker 161, and the microphone 162 can provide an audio interface between the user and the mobile terminal 100. The audio circuit 160 can transmit the electrical signal converted from the received audio data to the speaker 161, and the speaker 161 converts it into a sound signal for output. On the other hand, the microphone 162 converts the collected sound signal into an electric signal. After being received by the audio circuit 160, it is converted into audio data, and then processed by the audio data output processor 180, and then sent through the RF circuit 110 to, for example, another terminal, or output the audio data to the memory 120 for further processing. The audio circuit 160 may also include an earplug jack to provide communication between a peripheral earphone and the mobile terminal 100.

The mobile terminal 100 can help users receive requests, send information, etc. through the transmission module 170 (for example, a Wi-Fi module), and it provides users with wireless broadband Internet access. Although the transmission module 170 is shown in the figure, it is understandable that it is not a necessary component of the mobile terminal 100 and can be omitted as needed without changing the essence of the invention.

The processor 180 is the control center of the mobile terminal 100. Use various interfaces and lines to connect various parts of the entire mobile phone and execute various functions and processes of the mobile terminal 100 by running or executing software programs and/or modules stored in the memory 120, and calling data stored in the memory 120 data. Thus, the overall monitoring of the mobile terminal is carried out. Optionally, the processor 180 may include one or more processing cores. In some embodiments, the processor 180 may integrate an application processor and a modem processor. The application processor mainly deals with the operating system, user interface, and application programs. The modem processor mainly deals with wireless communication. It is understandable that the foregoing modem processor may not be integrated into the processor 180.

The mobile terminal 100 also includes a power source 190 (such as a battery) for supplying power to various components. In some embodiments, the power supply may be logically connected to the processor 180 through a power management system, so that functions such as charging, discharging, and power consumption management can be managed through the power management system. The power supply 190 may also include any components such as one or more DC or AC power supplies, a recharging system, a power failure detection circuit, a power converter or inverter, and a power status indicator.

Although not shown, the mobile terminal 100 also includes a camera (such as a front camera, a rear camera, etc.), a Bluetooth module, a flashlight, etc., which will not be repeated here. Specifically, in this embodiment, the display unit of the mobile terminal 100 is a touch screen display.

In addition to the above-mentioned embodiments, the present invention can also have other embodiments. All technical solutions formed by equivalent replacements or equivalent replacements fall within the protection scope of the present invention.

In summary, although the present invention has disclosed the preferred embodiments as above. However, the above-mentioned preferred embodiments are not intended to limit the present invention. Those of ordinary skill in the art can make various changes and modifications without departing from the spirit and scope of the present invention. Therefore, the protection scope of the present invention is subject to the scope defined by the claims.

What is claimed is:

1. A display panel having a flat area and a curved side area at least disposed on one side of the flat area, wherein the display panel comprises:
   a light-emitting device layer comprising a plurality of pixels, the pixels having a first opening area;
   a light exiting layer disposed above the light-emitting device layer and comprising a plurality of main light-concentrating structures corresponding to the pixels located in the curved side area, and the main light-concentrating structures having a second opening area;
   wherein in a direction from the curved side area to the flat area, a first difference between the first opening area and the second opening area gradually increases.

2. The display panel according to claim 1, wherein the light exiting layer further comprises an auxiliary light-concentrating structure corresponding to pixels located in the flat area, and the auxiliary light-concentrating structure has a third opening area, and a second difference between the first opening area and the third opening area is less than the first difference.

3. The display panel according to claim 2, wherein the first opening area is greater than the third opening area and/or the first opening area is less than the third opening area.

4. The display panel according to claim 2, wherein the light exiting layer does not comprise the auxiliary light-concentrating structure.

5. The display panel according to claim 1, wherein the light exiting layer comprises a pattern layer and a planarization layer covering the pattern layer, wherein:
   the pattern layer comprises a plurality of first light exiting structures located in the curved side area;
   the planarization layer comprises a plurality of second light exiting structures located between adjacent first light exiting structures;
   a refractive index of the pattern layer is less than a refractive index of the planarization layer;
   the main light-concentrating structure is composed of the second light exiting structure and a side surface of the first light exiting structure located beside the second light exiting structure.

6. The display panel according to claim 5, wherein a shape of the first light exiting structure is same as a shape of the pixel located in the curved side area.

7. The display panel according to claim 5, wherein a shape of the first light exiting structure is a circle, a shape of the pixel located in the curved side area is a quadrilateral, and a diameter of the first light exiting structure is between a diameter of an inscribed circle and a diameter of a circumscribed circle of the pixel located in the curved side area.

8. The display panel according to claim 1, wherein the light exiting layer comprises a pattern layer and a planarization layer covering the pattern layer, wherein:
   the pattern layer comprises a plurality of first light exiting structures located in the curved side area;
   the planarization layer comprises a plurality of second light exiting structures located between adjacent first light exiting structures;
   a refractive index of the pattern layer is greater than a refractive index of the planarization layer;
   a main light-concentrating structure is composed of the first light exiting structure and the planarization layer located above the first light exiting structure.

9. The display panel according to claim 5, wherein the refractive index of the pattern layer is any value between 1.3 and 1.6, and the refractive index of the planarization layer is any value between 1.5 and 1.9.

10. The display panel according to claim 1, wherein the first opening area is greater than the second opening area and/or the first opening area is less than the second opening area.

11. The display panel according to claim 1, wherein the display panel further comprises a substrate and an encapsulation layer, wherein:
   the light-emitting device layer is disposed on the substrate;
   the encapsulation layer covers the light emitting device layer;
   the light exiting layer is disposed on the encapsulation layer.

12. The display panel according to claim 1, wherein when a shape of the pixel and the main light-concentrating structure are same, a width of the pixel has a first size, a width of the main light-concentrating structure has a second size, and in the direction from the curved side area to the flat area, a difference between the first size and the second size gradually increases.

13. A mobile terminal comprising a display panel, the display panel having a flat area and a curved side area at least disposed on one side of the flat area, wherein the display panel comprises:

a light-emitting device layer comprising a plurality of pixels, the pixels having a first opening area;

a light exiting layer disposed above the light-emitting device layer and comprising a plurality of main light-concentrating structures corresponding to the pixels located in the curved side area, and the main light-concentrating structures having a second opening area;

wherein in a direction from the curved side area to the flat area, a first difference between the first opening area and the second opening area gradually increases.

14. The mobile terminal according to claim 13, wherein the light exiting layer further comprises an auxiliary light-concentrating structure corresponding to pixels located in the flat area, and the auxiliary light-concentrating structure has a third opening area, and a second difference between the first opening area and the third opening area is less than the first difference.

15. The mobile terminal according to claim 14, wherein the first opening area is greater than the third opening area and/or the first opening area is less than the third opening area.

16. The mobile terminal according to claim 14, wherein the light exiting layer does not comprise the auxiliary light-concentrating structure.

17. The mobile terminal according to claim 13, wherein the light exiting layer comprises a pattern layer and a planarization layer covering the pattern layer, wherein:

the pattern layer comprises a plurality of first light exiting structures located in the curved side area;

the planarization layer comprises a plurality of second light exiting structures located between adjacent first light exiting structures;

a refractive index of the pattern layer is less than a refractive index of the planarization layer;

the main light-concentrating structure is composed of the second light exiting structure and a side surface of the first light exiting structure located beside the second light exiting structure.

18. The mobile terminal according to claim 17, wherein a shape of the first light exiting structure is same as a shape of the pixel located in the curved side area.

19. The mobile terminal according to claim 17, wherein a shape of the first light exiting structure is a circle, a shape of the pixel located in the curved side area is a quadrilateral, and a diameter of the first light exiting structure is between a diameter of an inscribed circle and a diameter of a circumscribed circle of the pixel located in the curved side area.

20. The mobile terminal according to claim 13, wherein the light exiting layer comprises a pattern layer and a planarization layer covering the pattern layer, wherein:

the pattern layer comprises a plurality of first light exiting structures located in the curved side area;

the planarization layer comprises a plurality of second light exiting structures located between adjacent first light exiting structures;

a refractive index of the pattern layer is greater than a refractive index of the planarization layer;

a main light-concentrating structure is composed of the first light exiting structure and the planarization layer located above the first light exiting structure.

* * * * *